United States Patent Office 2,914,358
Patented Nov. 24, 1959

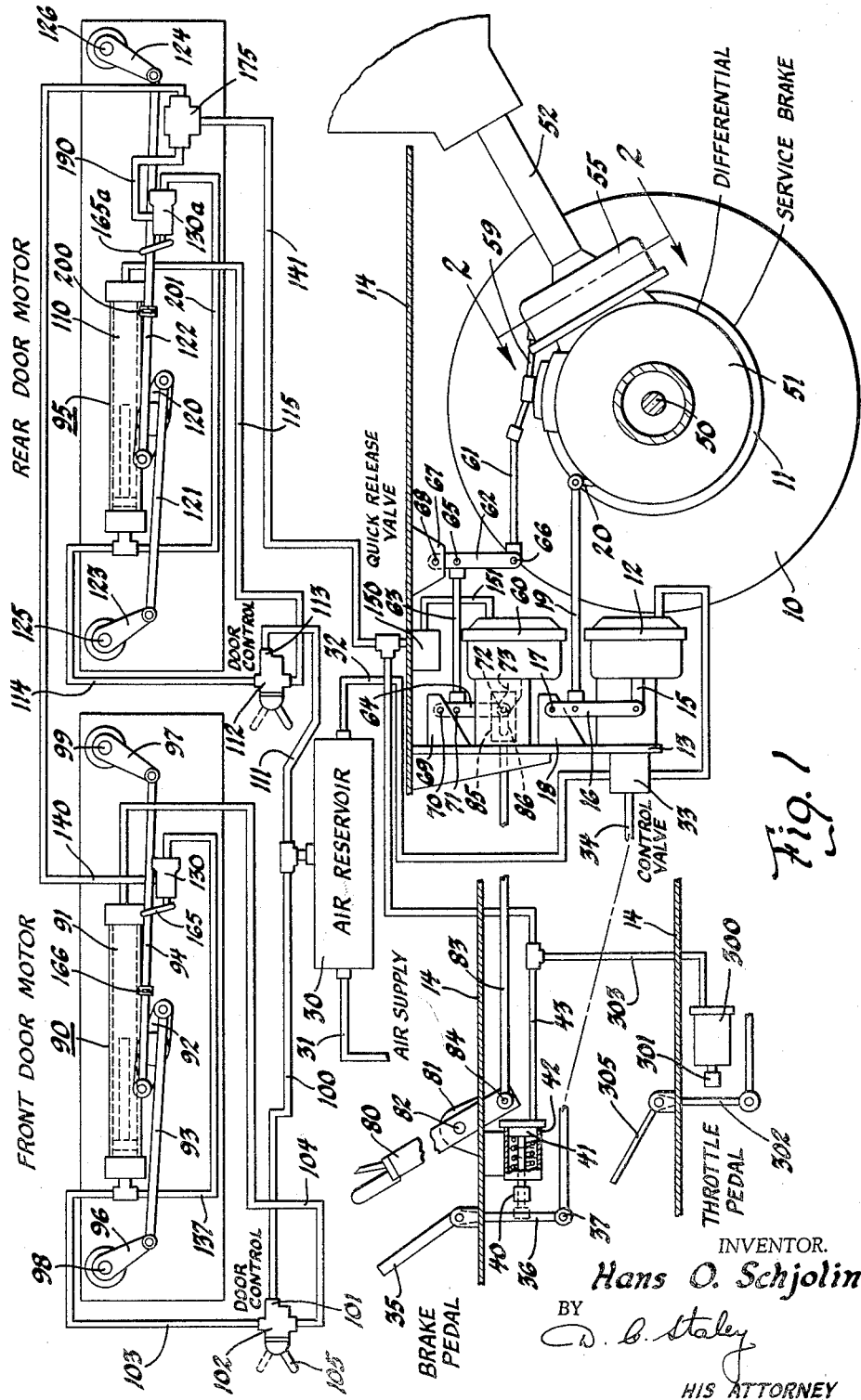

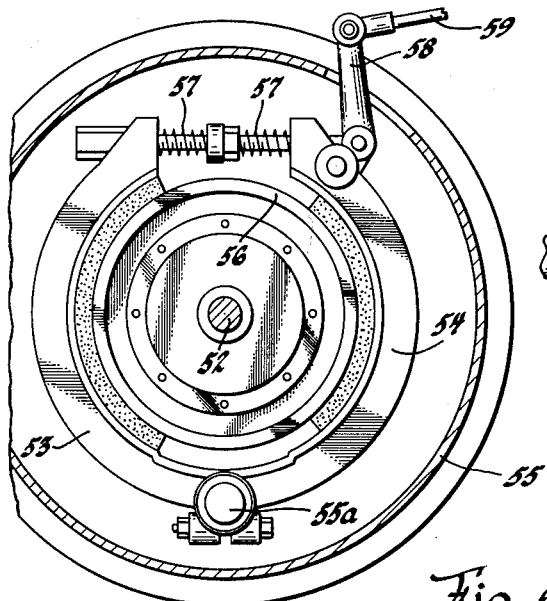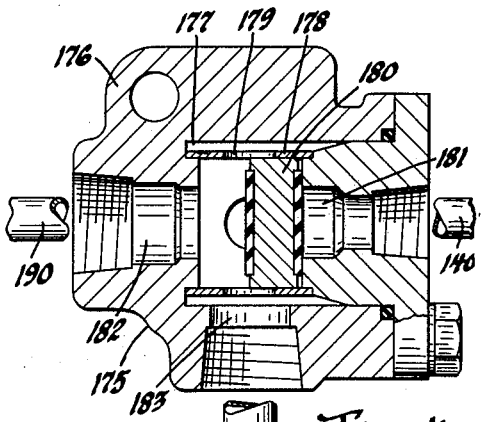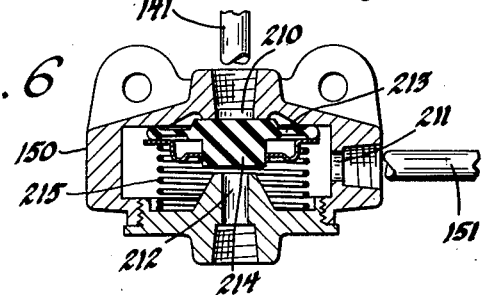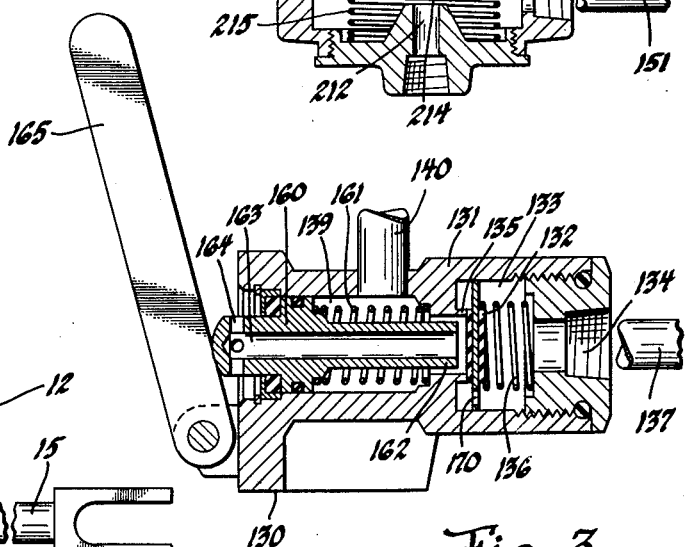

2,914,358

VEHICLE DOOR AND BRAKE INTERLOCK SYSTEM

Hans O. Schjolin, Birmingham, Mich., assignor to General Motors Corporation, Detroit, Mich., a corporation of Delaware Application October 21, 1957, Serial No. 691,266

9 Claims. (Cl. 303—6.1)

This invention relates to brake systems that are particularly applicable to motor vehicles, and more particularly to passenger buses.

In passenger buses, or other public conveyances, passengers board and discharge from the bus or public conveyance at short intervals. Each time the bus or public conveyance makes a stop, actuation of the service brakes is required to bring the vehicle to a stop. The operator of the vehicle then opens the door to allow passengers to board or discharge from the vehicle. During the period of time the passenger bus is standing still after it has been brought to a stop the operator is required to retain the service brakes applied in order to retain the passenger vehicle in a stationary condition and insure safety of the passengers for boarding or discharging from the conveyance.

When the passenger bus has been brought to a stop, the service brakes of the vehicle will have been heated by the act of bringing the conveyance to a stop so that at the moment the conveyance stops the heat in the service brakes is at a maximum value. To hold the bus in a stationary condition for passengers to board or discharge, the brakes are retained against the brake drums so that the heat created in the brake drums during the braking action to bring the bus to a stop is applied to the brake linings of the brake shoes with the result that the brake drums have no opportunity to cool down so long as the passenger bus is being held in a stationary position by the operator of the vehicle through application of the service brakes. This excessive heating of the brake linings tends to bake the linings by retention of excessive heat in the linings over prolonged periods of time and thereby reduces considerably the life of the linings.

Also, it is somewhat common practice with the operators of passenger vehicles to open the doors of the vehicle as the vehicle approaches a stop but before it has been actually brought to a full stop. Such a practice is dangerous to the passengers that intend to discharge from the bus, and is a practice that should be discouraged.

In this invention the passenger vehicle, which is usually a motor vehicle, is provided with a service brake system applied to the wheels of the vehicle and adapted for normal operation to bring the vehicle to a stop. In most passenger vehicles of any size the service brake system is actuated by air pressure so that in this invention the service brake system is one which includes an air motor for operating the service brakes at the wheels of the vehicle.

All vehicles are also provided with a parking brake or emergency brake system some of which operate on the same brakes as the service brakes so that the brake shoes are brought into engagement with the brake drum by a separate manually operated lever. However this type of system is not particularly applicable in this invention as it is proposed in this invention to provide the parking brake system or emergency brake system as an independent system from the service brake system. This parking brake system can either be an independent brake system operating on the wheels of the vehicle, or as more conventionally practiced the parking or emergency brake system can comprise a brake applied to the propeller shaft of the vehicle. However in either instance the parking or emergency brake system is completely independent of the service brake system, and this is the usual practice to provide for maximum safety for braking of the vehicle in the event the service brake system should fail for any reason.

In this invention the parking brake system or emergency brake system is adapted to be operated by an air motor which operates independent of the air motor which serves the service brake system.

It is an object of the invention to provide a brake system in which the service brake system can bring the vehicle to a stop in conventional manner, and then as the door of the vehicle is opened the service brake system will be rendered inactive to allow the brake shoes to release from the brake drums and thereby allow cooling of the brake drum and brake shoes, and concurrently with release of the service brake system the parking brake or emergency brake system will be activated to retain the vehicle in a stationary position so long as the door of the vehicle is open.

In passenger vehicles the doors are usually operated by air motors under control of the operator of the vehicle, suitable valve controls being provided to deliver air to the air motors and exhaust therefrom for opening and closing the doors.

It is an object of this invention to provide controls that are actuated by a door operating mechanism as the door operating mechanism approaches one extreme position, such as that to open the doors, so that air pressure can be delivered to the parking or emergency brake system to render that system active and at the same time supply fluid to controls which render the service brake system inactive. Thus when the operator actuates the door controls, and the door of the vehicle approaches an open position, the service brake system will be rendered inactive and the parking or emergency brake system will be rendered active automatically in response to operation of the door operating mechanism.

If the vehicle has been brought to a complete stop before the operator actuates the door control, the passenger vehicle will have been brought to a stop smoothly by the service brake system and then the passenger vehicle can be held stationary by the transfer of braking effort from the service brake system to the parking brake system upon opening of the door. However, if the operator of the vehicle is in the habit of opening the door before the vehicle is brought to a complete stop the automatic release of the service brake system and application of the parking brake system will bring the vehicle to a sudden jerking stop which will quickly discourage the operator of the vehicle from opening the door before the vehicle reaches a complete stop.

Further objects and advantages of the present invention will be apparent from the following description, reference being had to the accompanying drawings wherein a preferred form of the invention is clearly shown.

In the drawings:

Figure 1 illustrates a schematic system for the brakes of a motor vehicle and more specially a passenger vehicle incorporating features of this invention.

Figure 2 is a cross sectional view of line 2—2 of Fig. 1 illustrating a type of propeller shaft brake adaptable for use as a parking or emergency brake system independent of the service brake system.

Figure 3 is a cross sectional view of a control valve providing for automatic transfer of application of the brake system from service brake to parking or emergency brake.

Figure 4 is a cross sectional view of a transfer valve providing for delivery of fluid to the emergency brake system from two different directions.

Figure 5 is a cross sectional view of a somewhat conventional air motor for operating the brakes.

Figure 6 is a cross sectional view of a quick release valve for exhausting air pressure from the air motor that operates the emergency or parking brake system.

The brake system of this invention is particularly applicable to passenger vehicles, or passenger buses, that are called upon to make numerous stops at relatively close intervals which thereby requires substantial use of the service brakes of the vehicle and substantial heating of the brakes.

In this invention the passenger vehicle may have one or more wheels 10 provided with a service brake 11 adapted for normal braking action to bring the vehicle to a stop. The service brake 11 may be of one of many conventional types adapted for operation by a fluid motor, or air motor 12. The air motor 12 is supported upon a bracket 13 secured to the vehicle frame 14 and includes an actuating plunger 15 that is connected to a lever 16 supported by the pivot 17 on a bracket 18. The lever 16 carries a link 19 that engages an arm 20 connected with the service brake 11 for actuation of the service brake whenever air or fluid is supplied to the motor 12, and adapted to provide for de-activation of the service brake 11 when fluid or air is exhausted from the motor 12.

The air motor 12 may be of the type illustrated in Fig. 5 wherein a closed chamber 21 has a flexible diaphragm 22 separating the chamber 21 into two compartments, one on the left hand side of the diaphragm and one on the right hand side thereof. A fluid pressure inlet 23 is provided in the wall of the chamber 21 for supply of air to actuate the motor. The diaphragm 22 is spring urged to the position shown in Fig. 5 by the compression spring 25 whenever air or other fluid is released from the chamber compartment on the left hand side of the diaphragm 22.

Air is supplied to the air motor 12 from a reservoir 30 which receives air under pressure through the supply line 31 from any suitable source, such as a compressor driven by the engine of the motor vehicle. Air under pressure from the reservoir 30 is supplied through the conduit 32 to the control valve 33 that controls supply of air to the air motor 12 and exhaust of air therefrom. The control valve 33 may be of any conventional type adapted for operation of the air motor 12 to apply the service brakes and to exhaust air from the air motor when the service brakes are to be released. This control valve 33 is exhausted by a control rod or link 34 that is connected with the foot pedal 35 adapted for operation by the operator of the vehicle. The foot pedal or brake pedal 35 has an arm 36 connected with the link 34 by the pivot connection 37.

Operation of the brake pedal or treadle 35 causes actuation of the control valve 33 to supply air under pressure from the reservoir 30 to the air motor 12 and thereby move the diaphragm 22 in a right hand direction as shown in Fig. 5, which becomes a left hand direction in Fig. 1, whereby the plunger 15 moves in a left hand direction to actuate the lever 16 and the link 19 and thereby operate the service brake to effect application of the brake. Release of the pedal 35 by the operator of the vehicle actuates the control valve 33 to provide for exhaust of air from the air motor 12 and thereby allow the spring 25 to return the diaphragm to the position shown in Fig. 5 and effect release of the service brake 11.

The service brake 11 is caused to be released forcefully when a door of the vehicle is opened by means of a plunger 40 actuated by a piston 41 that operates in a cylinder 42, the cylinder receiving air under pressure through the conduit line 43 when the door of the vehicle is opened in a manner hereinafter described.

The wheel 10 of the vehicle is carried upon a conventional axle 50 that also carries a differential 51, the differential 51 being operated by a propeller shaft 52 that is driven by the engine of the vehicle.

A propeller shaft brake 55 provides the parking or emergency brake system for the vehicle. This propeller shaft brake 55 is somewhat conventional in form but is more particularly shown in Fig. 2. The brake 55 consists of a brake drum 56 carried upon the propeller shaft 52. Brake shoes 53 and 54 pivotally mounted on the pin 55a have their respective linings engageable with the brake drum 56. The shoes 53 and 54 are normally held out of engagement with the brake drum 56 by the compression springs 57. The brake shoes 53 and 54 are caused to engage the brake drum 56 when the brake lever 58 is operated.

The brake lever 58 is connected by a link 59 with an air motor 60 through a link and lever system consisting of the link 61, the lever 62, the link 63 and the lever 64. Links 63 and 61 are pivotally connected to the lever 62 by the pins 65 and 66, the lever 62 being carried upon the brackets 67 by the pin 68. The lever 64 is carried upon a bracket 69 by a pin 70 with the link 63 being connected to the lever 64 by a pivot pin 71. The lever 64 is also connected to the air motor 60 by a pin 72 that connects with the actuating arm 73 that extends from the air motor 60. The air motor 60 is comparable to that of the air motor 12 and operates in the same manner so that when air is supplied to the air motor 60 the internal diaphragm moves the actuating arm 73 in a left hand direction to operate the link and lever system heretofore described and thereby apply the brake shoes 53 and 54 of the parking or emergency brake upon the drum 56 and thereby prevent rotation of the propeller shaft 52 and retain the vehicle in a stationary position.

The propeller shaft brake 55 is also adapted for manual operation by the emergency or parking brake lever 80 that is carried on a bracket 81 by a pivot pin 82, the lower end of the lever 80 connecting with the link 83 pivotally carried on the lever by a pin 84. The link 83 carries a block 85 on the end thereof through which the pin 72 that connects the air motor 60 with the lever 64 extends. This pin 72 thus interconnects the block 85, the lever 64 and the arm 73 extending from the air motor 60. The block 85 has an elongated slot 86 in which the pin 72 can slide when the air motor 60 is actuated and the emergency brake lever 80 is stationary. Thus either the air motor 60 or the emergency brake lever 80 can operate the parking or emergency brake 55 independently of one another.

Most pasenger vehicles have a front door operating mechanism 90 and a rear door operating mechanism 95. The front door operating mechanism comprises an air motor 91 that rotates a link 92 whereby to move the links 93 and 94 in left and right hand directions respectively to rotate the links 96 and 97 on their axes 98 and 99 and thereby open the front doors of the vehicle. The air motor 91 is supplied with air under pressure from the reservoir 30 through a conduit 100 that connects with the inlet 101 of an operator actuated door control valve 102. The door valve 102 is of conventional type and is therefore not specifically illustrated herein.

The door control valve 102 has the conduit lines 103 and 104 that connect to opposite ends of the air motor 91 providing for supply and exhaust of air to and from the air motor alternately as the operating handle 105 of the valve 102 is shifted between the full line and dotted line positions for either closing or opening the doors respectively, the door valve 102 and the air motor 91 being shown in the position in which the doors are closed.

Similarly, the rear door operating mechanism 95 consists of an air motor 110 supplied with fluid under pressure from the reservoir 30 by a conduit 111 that connects with the door control valve 112 through the inlet 113. The door control valve 112 has the conduits 114 and 115 connecting with opposite ends of the air motor 110 for supply and exhaust of air to and from the air motor to operate the same in a manner as operation of the air motor 91 for the front door of the vehicles.

The air motor 110 rotates the link 120 and thereby moves the links 121 and 122 and left and right hand directions respectively to rotate the links 123 and 124 about their axes 125 and 126 to open and close the rear doors of the vehicle.

Operation of the door operating mechanisms 90 and 95 is independent of any operation of the brake systems heretofore described except as hereinafter described with reference to the automatic coordination between the door operating mechanisms 90 and 95 and the brake systems to effect application of the parking brake system and de-activation of the service brake system concurrently with operation of one or the other of the door operating mechanisms as they approach their extreme position to open the doors of the vehicle, and to reversely deactivate the parking brakes of the system and provide for activation of the service brake system when the doors of the vehicle are closed.

A control valve 130 is provided at one end of the air motor 91 to provide for supply of air to the air motor 60 to operate the emergency or parking brake 55 when the air motor 91 reaches one extreme position of opening the doors. Concurrently the air under pressure is supplied to the cylinder 42 to work against the operator actuated brake pedal 35 and force the operator to release the service brake 11.

The valve 130 is more specifically illustrated in Fig. 3 and consists of a housing 131 having a slidable valve member 132 contained within a chamber 133 that has an inlet connection 134, the valve 132 being retained on its seat by means of a compression spring 136. The inlet connection 134 is connected by a conduit 137, with a conduit 103 that supplies air under pressure to the left hand end of the air motor 91 which causes opening of the doors. Thus the valve 130 is supplied with air concurrently with supplying air to the air motor 91 at the time the doors of the vehicle are being opened.

The valve 132 of the valve 130 separates the chamber 133 from the chamber 139, the chamber 139 connecting by way of conduit 140 with a conduit 141 that supplies air under pressure to a quick release valve 150, hereinafter described, which in turn supplies air under pressure to the air motor 60 through the conduit 151.

The chamber 139 of valve 130 has a plunger member 160 spring urged to the position shown in Fig. 3 by the compression spring 161 whereby the end 162 of the plunger 160 is retained out of engagement with the valve element 132. The plunger 160 has a longitudinal passage 163 that terminates in radial passages 164 to allow for exhaust of air from within the chamber 139.

The plunger 160 is actuated by a lever 165 which in turn is actuated by a striker member 166 carried on the link 94 of the front door operating mechanism 90.

Thus, when the front door mechanism is actuated by the operator of the vehicle shifting the lever 105 from the full line position shown to the dotted line position thereof, air will be supplied through the line 103 to the air motor 91 thereby starting actuation of the air motor to move the link 94 in a right hand direction and open the door of the vehicle. As the striker member 166 engages the lever 165 of the valve 130, the plunger 160 is moved in a right hand direction until it engages the valve element 132 whereby to close the passage 163 in the plunger 160 and thereby close off exhaust from the chamber 139. As soon as the valve element 132 is lifted from its seat 135 air under pressure now standing in line 137 as a result of the previous operation of the door valve 102 will pass through the openings 170 in the valve element 132 and thence into chamber 139 for delivery into conduit 140. Air under pressure in the conduit 140 will pass through the transfer or shuttle valve 175, hereinafter described, and thereby enter the conduit 141 to operate the quick release valve, hereinafter described. Operation of the quick release valve will permit air under pressure to flow through the conduit 151 to the air motor 60 and thereby actuate the parking or emergency brake 55 in a manner hereinbefore described. Concurrently air under pressure is delivered through the conduit 43 to the cylinder 42 to force the operator actuated pedal 35 in a right hand direction and thereby operate the control valve 33 of the air motor 12 to effect release of the service brake 11.

It will thus be seen that when the air motor 91 of the front door operating mechanism 90 is actuated, when it approaches its extreme end position of opening the doors, there will be an automatic transfer of brake holding from the service brake to the parking or emergency brake so that at all times there will be a brake holding the vehicle stationary after it has once been brought to a stop and the door opened. It will also be appreciated that at this time the heat accumulated in the service brake as a result of the braking action to bring the vehicle to a stop can now dissipate with the brake shoes of the service brake out of engagement with the brake drum. The shuttle valve 175 is more particularly illustrated in Fig. 4. This valve consists of a housing 176 that has a chamber 177 provided with a sleeve 178 spaced from the wall of the chamber and having a series of peripheral holes 179. A valve element 180 is slidable in the sleeve 178 from a position shown closing the inlet opening 181 to an opposite position to close inlet opening 182. Outlet opening 183 connects with conduit 141. Inlet opening 181 connects with conduit 140 and inlet opening 182 connects with conduit 190 that connects with a control valve 130a comparable to the control valve 130.

The rear door operating mechanism 95 has an air control valve 130a associated therewith in the same manner as valve 130 is associated with the front door operating motor 91. The link 122 of the rear door operating mechanism 95 has a striker block 200 that engages the lever 165a of the valve 130a to shift the valve 130a in the same manner heretofore described with reference to valve 130 to provide for delivery of air under pressure from the conduit 201 into the conduit 190 and thereby through the shuttle valve 175 to the conduit 141 and thence through the quick release valve 150 into the conduit 151 and into the air motor 60 for operating the parking or emergency brake 55.

When either or both door operating motors 91 and 110 are returned to the position shown in Fig. 1 under control of the door operated control valves 102 and 112, the valves 130 and 130a will be in the position shown in Fig. 3 to provide for exhaust of air from the conduit 141 and thus from the air motor 60 and from the cylinder 42. When this occurs the parking or emergency brake 55 will be released and the compression spring in cylinder 42 will move the piston 41 backwardly to remove it from engagement with the manually operated foot pedal 35 and allow the service brake 11 to be operated under manual control of the operator of the vehicle.

The quick release valve 150, more particularly shown in

Fig. 6 has an inlet connection 210 that connects with the conduit 141 and an exhaust connection 211 that connects with the conduit 151. The quick release valve 150 also has an exhaust port 212 that connects with atmosphere. Normally the exhaust port 212 is open and the inlet port 210 is closed as shown in Fig. 6. However, when air pressure enters the conduit 141 the diaphragm 213 permits movement of the valve element 214 to close the exhaust port 212 and then flexing of the diaphragm 213 allows air to pass from the port 210 to the port 211 for delivery of air into the conduit 151 to supply the air motor 60. When air is exhausted from the conduit 141, the reduced air pressure in the quick release valve body will permit the compression spring 215 to close the inlet port 210 and open the exhaust port 212 to allow exhaust of air from the motor 60 and thereby permit release of the emergency or parking brake 55. To insure closing movement of the throttle pedal at the time any door of the vehicle is opened, a pressure cylinder 300 having a plunger 301 extensible therefrom when air under pressure is delivered into the cylinder 300 is positioned adjacent the bell crank lever 302 to engage the same when air under pressure is delivered to the conduit 43 and simultaneously to the conduit 303 so that both the cylinders 300 and 42 will operate concurrently to force the operator of the vehicle to remove his foot from the throttle pedal 305 as well as from the brake pedal 35. The cylinder 300 may be used as an auxiliary piece of equipment in addition to that of the cylinder 42.

While the form of embodiment of the invention as herein disclosed constitutes a preferred form, it is to be understood that other forms might be adopted as may come within the scope of the claims which follow.

What is claimed is as follows:

1. In a door and brake interlock system for a motor vehicle, the combination of, mechanism to open and close a door of a vehicle, a first wheel brake on the vehicle, a second brake on the vehicle separated from and independent of the first brake to retain the vehicle stationary when applied, and mechanism connected with said door mechanism to release said wheel brake and apply said second brake concurrently and with opening operation of said door mechanism on actuation thereof to retain the vehicle stationary by said second brake so long as the door of the vehicle remains open.

2. In a door and brake interlock system for a motor vehicle, the combination of, mechanism to open and close a door of a vehicle, a first wheel brake on the vehicle, a second brake on the vehicle separated from and independent of the first brake to retain the vehicle stationary when applied, and mechanism connected with said door mechanism to render said wheel brake ineffective and apply said second brake concurrently and with operation of said door mechanism upon opening of the door, said second brake retaining said vehicle stationary so long as the door of the vehicle remains open.

3. In a door and brake interlock system for a motor vehicle, the combination of, mechanism to open and close a door of a vehicle, a first wheel brake on the vehicle, a second brake on the vehicle separated from and independent of the first brake, and mechanism connected with said door mechanism to render said wheel brake ineffective and apply said second brake concurrently and with operation of said door mechanism on actuation thereof in opening movement and to release said second brake on movement of the door mechanism in closing direction whereby to release the vehicle from all brake holding action.

4. In a door and brake interlock system for a motor vehicle, the combination of, mechanism to open and close a door of a vehicle, a first wheel brake on the vehicle, a second brake on the vehicle separated from and independent of the first brake to retain the vehicle stationary when applied, and mechanism connected with said door mechanism to release said wheel brake and apply said second brake concurrently and with opening operation of said door mechanism when the door approaches its extreme open position and retain the vehicle stationary by said second brake so long as the door of the vehicle remains open.

5. In a door and brake interlock system for a motor vehicle, the combination of, fluid operated mechanism to open and close a door of a vehicle, a first fluid operated wheel brake on the vehicle, a second fluid operated brake on the vehicle separated from and independent of the first brake, and fluid flow control valve mechanism connected with said door mechanism providing for control of flow of fluid to said second brake on movement of the door mechanism to one extreme position whereby to energize the second brake, and additional means receiving fluid concurrently with said second brake and connected with said wheel brake to render said wheel brake inactive so long as said second brake remains active.

6. In a door and brake interlock system for a motor vehicle, the combination of, fluid operated mechanism to open and close a door of a vehicle, a first fluid operated wheel brake on the vehicle, a second fluid operated brake on the vehicle separated from and independent of the first brake, and mechanism connected with said door mechanism providing for flow of fluid to said second brake on movement of the door mechanism to one extreme position whereby to energize the said second brake, and other means receiving fluid concurrently with said second brake to render said first brake inactive so long as said second brake is active, and still other means rendered active by release of fluid from said door operating mechanism providing for release of fluid from said second brake to render the same inactive and thereby release the vehicle from all brake holding action.

7. A door and brake interlock system in accordance with claim 1 in which the first brake is a fluid actuated wheel brake and the second brake is a fluid actuated vehicle propeller shaft brake.

8. In a door and brake interlock system for a motor vehicle, the combination of, fluid actuated mechanism to open and close a door of a vehicle, a first manually actuated fluid operated wheel brake on the vehicle, a second brake on the vehicle separated from and independent of the wheel brake and including manual actuating means for operating the second brake independently of the wheel brake, fluid operated means connected with said second brake and providing means to actuate said second brake independent of said manual means therefor, fluid operated means operable on said wheel brake to render the same ineffective for braking action, and fluid flow control means actuated by said door operating mechanism as it approaches open position for the door to provide for flow of fluid concurrently to said fluid operated means which operates said second brake and said fluid operated means which renders said first brake ineffective to render said second brake active and said first brake inactive concurrently.

9. In a door and brake interlock system for a motor vehicle, the combination of, fluid actuated mechanism to open and close a door of a vehicle, a first manually actuated fluid operated wheel brake on the vehicle, a second brake on the vehicle separated from and independent of the wheel brake and including manual actuating means for operating the second brake independently of the wheel brake, fluid operated means connected with said second brake and providing means to actuate said second brake independent of said manual means therefor, fluid operated means operable on said first brake to render the same ineffective for braking action, and fluid flow control means actuated by said door operating mechanism as it approaches open position for the door having one position to provide for flow of fluid concurrently to said fluid operated means which operates said second brake and said fluid operated means which renders said first brake ineffective to render said second brake active and said first brake inactive concurrently and a second position to exhaust the so supplied fluid to render said fluid operated means for the second brake and said fluid operating means for the first brake ineffective concurrently to release the vehicle from all brake holding action.

References Cited in the file of this patent

UNITED STATES PATENTS

| | | |
|---|---|---|
| 2,179,704 | Schjolin | Nov. 14, 1939 |
| 2,189,221 | Paine et al. | Feb. 6, 1940 |
| 2,311,806 | Almond | Feb. 23, 1943 |
| 2,429,197 | Price | Oct. 14, 1947 |